(No Model.)

D. C. RIPLEY.
GLASS CASTER.

No. 291,086. Patented Jan. 1, 1884.

Witnesses
Wm H Finckel
J. C. Huntsman

Inventor
Daniel C. Ripley
by his attorneys
Bakewell & Kerr

UNITED STATES PATENT OFFICE.

DANIEL C. RIPLEY, OF PITTSBURG, PENNSYLVANIA.

GLASS CASTER.

SPECIFICATION forming part of Letters Patent No. 291,086, dated January 1, 1884.

Application filed November 13, 1883. (No model.)

*To all whom it may concern:*

Be it known that I, DANIEL C. RIPLEY, of Pittsburg, in the county of Allegheny and State of Pennsylvania, have invented a new and useful Improvement in Glass Casters; and I do hereby declare the following to be a full, clear, and exact description thereof.

The glass caster now in use which my improved caster most nearly resembles consists either of a dish-shaped stand having its interior divided into bottle-receptacles by integral glass partitions extending across the same, or of a dish without partitions, being of size just sufficient to receive the caster-bottles, which support each other against their sides. Both of these forms are open to objection. In the first-mentioned variety the partitions must be made thick and very heavy to prevent their being broken by hasty and careless replacing of the caster-bottles therein, to which they are exposed when in use. This increases the weight and cost extremely, and detracts from the beauty and consequent salable qualities of the article, besides necessitating the use of a split plunger, which is more expensive and difficult to make and keep in repair than a plain one. The second variety above mentioned is free from these objections, but is imperfect because the caster-bottles are apt to fit loosely in the stand and are easily displaced and overthrown.

My invention consists of an improved and economical construction of the caster.

I will now describe my invention so that others skilled in the art may manufacture and use it, reference being had to the accompanying drawings, forming part of this specification, in which—

Figure 1:
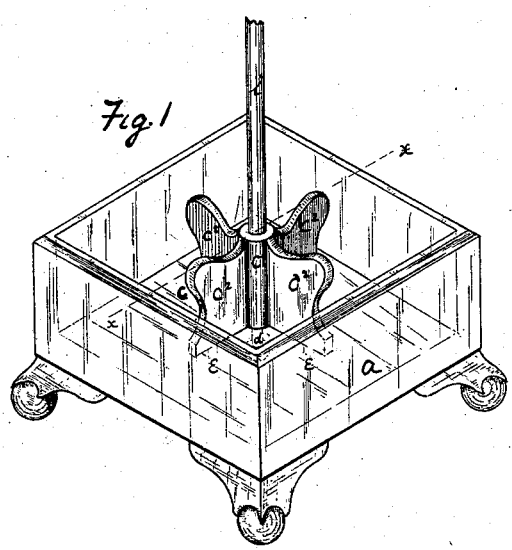
Figure 2:
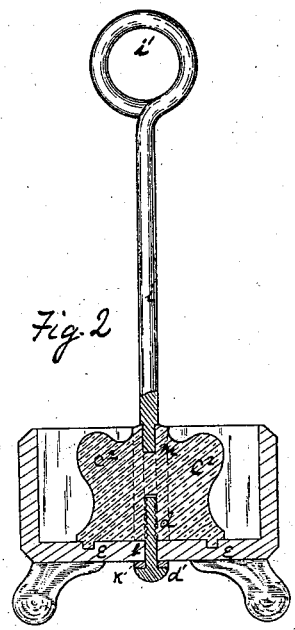
Figure 3:
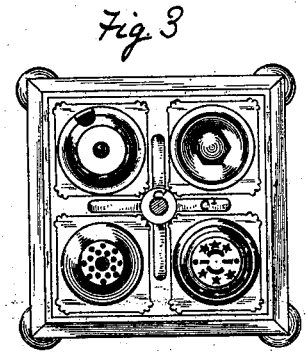
Figure 5:
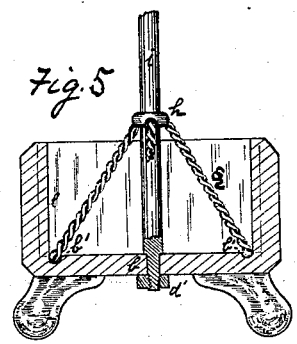
Figure 4:
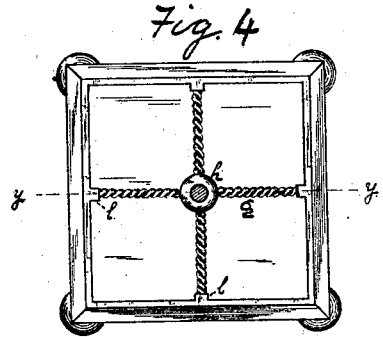

Figure 1 is a perspective view of my improved caster. Fig. 2 is a vertical section on the line $x\ x$ of Fig. 1. Fig. 3 is a plan view of the caster represented in Fig. 1, showing the caster-bottles in position. Fig. 4 is a plan view of a modification of my improvement, showing a different construction of the partitions of the bottle-receptacles. Fig. 5 is a vertical section on the line $y\ y$ of Fig. 4.

Like letters of reference indicate like parts wherever they occur.

The body $a$ of my improved caster is made of glass by pressing by means of a suitable mold and plunger, and is in form of a shallow dish perforated at or near the central portion of the bottom by a hole or holes, $b$, designed to secure to the bottom of the caster-stand and in the inside thereof a radial partition or partitions, $c$, which divide the caster-stand into the desired number of bottle-receptacles. These partitions may be made in one piece of glass or suitable metal, consisting of a central core, $c'$, with radially-projecting wings or flanges $c^2$, the whole being secured to the center of the caster-stand bottom by a screw-bolt, $d$, passing through the hole $b$, and screwed to the cor- of the partition-piece. There may also be pins $e$ cast or otherwise attached to the under side of the extremities of the radially projecting wings $c^2$, and passing through corresponding holes or recesses in the bottom of the stand, the object of which is to hold the partitions more firmly in place, and at the same time to form a brace for the handle of the caster. In this form of construction I prefer to construct the four wings of the partition-piece $c$ in length about one-half the normal distance from the central point of the caster-bottom to the sides of the caster-stand, and place them respectively at right angles to the sides.

Instead of having the partitions of the bottle-receptacles integral, as above described, the form of construction illustrated in Figs. 4 and 5 of the drawings may be used, in which arms $g$, formed of metal wire or other suitable material and shape extend from an annular projection or collar, $h$, on a vertical rod, $i$, situate in the center of the caster-stand to or toward the middle portions of the sides of the caster, where they are secured in holes or recesses $b'$ made in the side or bottom of the caster. In this case the rod $i$ is secured to the bottom of the stand, by bolts or otherwise, through the hole $b$ a washer, $k$, however, being preferably interposed between the head $d'$ of the bolt $d$ and the glass bottom of the stand to prevent fracture. The rod $i$ may with advantage be extended so as to project above the caster-bottles when in position, and be provided with a suitable handle device, $i'$, as shown in Fig. 2, to facilitate lifting and carrying of the caster-stand, and this same device is preferably applied to other forms of my improvement, as by attaching the rod $i$ to the core $e$ of the partition, as at $m$, by screws or otherwise, as shown in Figs. 1 and 2.

In both the above-described forms of partition the bottle-receptacles may be made firmer and more effectual by small projections $l$, pressed upon the sides of the caster-stand and respectively opposite to and in the planes of the radial partitions, as shown in Figs. 4 and 5. In this way each of the four corners of the caster-bottle may be supported by partition with the same good effect as if the partitions were extended entirely across the body of the caster, but without the disadvantages of great weight and liability to fracture arising therefrom.

The arms $g$ may extend at right angles from the rod $i$ to the sides of the stand $a$, if desired.

What I claim as my invention, and desire to secure by Letters Patent, is—

1. A glass caster having a common receptacle for the bottles, divided into compartments by a central wing-piece provided with radially-projecting wings or arms, substantially as and for the purposes described.

2. A glass caster having a common receptacle for the bottles, and central stem secured thereto, and provided with radially-projecting wings or arms, substantially as and for the purposes described.

3. A glass caster having a common receptacle for the bottles, and a metallic central piece having radial arms or wings for dividing the receptacle into bottle-compartments, substantially as and for the purposes described.

4. A glass caster having a common receptacle for the bottles and internal ribs or projections on the sides, so as to extend between adjacent bottles, substantially as and for the purposes described.

In testimony whereof I have hereunto set my hand this 10th day of November, A.D. 1883.

DANIEL C. RIPLEY.

Witnesses:
W. B. CORWIN,
THOMAS B. KERR.